United States Patent Office 3,360,510
Patented Dec. 26, 1967

3,360,510
METHYLATED POLYSACCHARIDE AND
METHOD OF MAKING
Alexander Farkas, 425 NE. 173rd St.,
North Miami Beach, Fla. 33162
No Drawing. Filed Mar. 17, 1966, Ser. No. 535,042
1 Claim. (Cl. 260—209)

ABSTRACT OF THE DISCLOSURE

A polysaccharide product derived from the juice of the aloe plant utilized as a starting material subjected to a methylation process to introduce methyl groups into the molecule to improve resistance to depolymerization by the action of air-borne fungi and enzymes, having the formula:

A methylated polysaccharide having the formula $$[(glucose)_m \cdot (mannose)_m \cdot (glucuronic\ acid\ residue)_n \cdot (Ca)_p (CH_3)_q \cdot YH_2O]_x$$

where $m$ is an integer providing from about 30 to about 37%, by weight, of the unit; $n$ is an integer providing from about 0.9 to about 1.7% of the unit; $p$ is an integer which provides from about 11.5 to about 14.2% of the unit; $q$ is an integer providing from about 2 to about 20% of the unit; $Y$ is an integer providing 0 to about 8.5% of the unit, and $x$ is an integer providing a molecular weight of from about 430,000 to about 620,000.

---

The present invention relates to a novel polysaccharide product derived from the juice of the aloe plant, and to a method for making the same.

Polysaccharide products derived from the juice of the aloe plant are known to have therapeutic properties particularly in the treatment of wounds of the skin and other body tissue (see, for example, Patent 3,103,466). In my copending application Ser. No. 515,469, filed Dec. 21, 1965, is disclosed and claimed a novel polysaccharide derived from the aloe plant which represents a marked improvement over prior materials derived from aloe. This material is in the form of long polymer chains, described more in detail hereinafter. It has been found that this material can depolymerize due to the action of airborne fungus and especially under the action of enzymes present in the plant and that this is not desirable.

The principal objects of the present invention are to provide substantial improvements in polysaccharide products derived from the juice of the aloe plant and in methods of processing the juice to provide such products by introducing other functional groups.

A specific object is to provide a polysaccharide product from aloe which has improved resistance to depolymerization by the action of air-borne fungi and enzymes as compared to the aforementioned polysaccharide product.

These and other objects will become apparent from a consideration of the following specification and claims.

The foregoing objects are realized by methylating the aforementioned polysaccharide product of copending application Ser. No. 515,469.

The starting material in accordance with the present invention is a polysaccharide in the form of long polymer chains made up of repeating units, each of which units contains substantially equal amounts of glucose and mannose residues, these combining to make up the preponderant portion of the unit, a small proportion of glucuronic acid residue, and chemically bound calcium. The material may be anhydrous or may contain chemically bound water. Analysis of the products shows:

|  | Percent by weight |
|---|---|
| Glucose residue | 35–40 |
| Mannose residue | 35–40 |
| Glucuronic acid residue | 1–2 |
| Chemically bound calcium | 13–16 |
| Chemically bound water | 0–9 |

The glucuronic acid residue is associated with calcium; that is, the glucuronic acid is present as calcium glucuronate. Because of the relative proportions of glucuronic acid residue and calcium, only a small proportion of the calcium is combined with the carboxyl groups of the glucuronic acid portion of the molecule and the remaining is chemically bound to a portion each of the glucose and mannose portions of the molecule. The material has a very high molecular weight which averages about 450,000 but can vary from about 420,000 to about 520,000 depending upon slight variations in the process and upon the age of the juice or of the cut leaves from which it is pressed, and also upon whether or not it is anhydrous or in hydrated form.

The starting material may be depicted as $$[(glucose)_m \cdot (mannose)_m \cdot (glucuronic\ acid\ residue)_n \cdot (Ca)_p \cdot YH_2O]_x$$

where $m$ is an integer providing from about 35 to about 40%, by weight, of the unit; $n$ is an integer providing from about 1 to about 2% of the unit; $p$ is an integer which provides from about 13 to about 16% of the unit; $Y$ is an integer providing from 0 to about 9% of the unit, and $x$ is an integer providing a molecular weight from about 420,000 to about 520,000. The preferred starting material is the hydrate in which $Y$ is from about 6 to about 9.

The preparation of the starting material is set forth in said copending application Ser. No. 515,469 and references may be made thereto for any further information desired beyond the description set forth below and in the working examples. The process of preparation comprises mixing with the juice of the leaves of the aloe plant, a dilute aqueous solution of phosphomolybdic acid until precipitation of insoluble matter is substantially complete; separating the insoluble precipitate from the aqueous solution; mixing the aqueous solution with a water-soluble, lower aliphatic polar solvent until precipitation of blue-green insoluble matter is substantially complete; adding to the resulting dispersion of blue-green precipitate aqueous hypochlorous acid until said precipitate is essentially white, and recovering the precipitate. The preparation of the material in anhydrous form differs from the preparation in hydrate form in washing the final precipitate within an anhydrous water-soluble lower aliphatic polar solvent.

According to the present invention, the above-described polysaccharide starting material, in finely-divided (flake or powder) form, is subjected to a methylation process to introduce methyl groups into the molecule. It is believed that these replace aldehyde hydrogen atoms in the glucose and mannose portions of the molecule. The extent of methylation can be varied from about 2% to about 20%—that is, the resulting polymer will contain from about 2 to about 20%, by weight, of added methyl groups. To the extent methyl groups are added, the molecular weight of the product is increased over that of the polysaacharide starting material. The product may also be anhydrous or in hydrated form depending upon whether the starting polysaccharide is anhydrous or hydrated and upon whether hydrous or anhydrous washing solvents are used. Analysis of the product shows:

| | Percent, by weight |
|---|---|
| Glucose residue | 30 to 37 |
| Mannose residue | 30 to 37 |
| Glucuronic acid residue | .9 to 1.7 |
| Chemically bound calcium | 11.5 to 14.2 |
| Chemically bound water | 0 to 8.5 |
| Methyl groups ($CH_3$) | 2 to 20 |

The product may be depicted as:

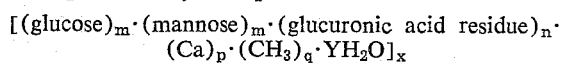

where $m$ is an integer providing from about 30 to about 37%, by weight, of the unit; $n$ is an integer providing from about 0.9 to about 1.7% of the unit; $p$ is an integer which provides from about 11.5 to about 14.2% of the unit; $q$ is an integer providing from about 2 to about 20% of the unit; $Y$ is an integer providing 0 to about 8.5% of the unit; and $x$ is an integer providing a molecular weight of from about 430,000 to about 620,000. As is the case with the starting material, the glucuronic acid portion of the unit in the methylated product is present as calcium glucuronate.

In methylating the polysaccharide starting material, dry hydrogen chloride gas is passed into a dispersion of the polysaccharide in anhydrous methanol. While the concentration of polysaccharide in the dispersion does not appear to be critical, generally from about 20 to about 30 parts by weight of methanol are used per part of polysaccharide. The amount of hydrogen chloride may range from about 0.2 to about 4%, by weight, thereof based on the weight of the polysaccharide.

Methylation is advantageously carried out at a temperature above room temperature, especially at from about 40° C. to boiling. Refluxing is preferred. The reaction takes about 1 to about 4 hours.

Advantageously, there is also present in the reaction mixture a material protecting the calcium in the polysaccharide from reaction with the hydrogen chloride. Particularly satisfactory materials in this regard are ethylene glycol and propylene glycol. From about 0.5 to about 3%, by weight, of the glycol based on the weight of the methanol is suitable.

After methylation, the insoluble polysaccharide product is separated from the reaction mixture as by filtering, centrifuging, or the like, and washed to remove HCl and any $CaCl_2$ that may have formed, as well as glycol. Washing advantageously is accomplished with methanol, and is repeated one to several times. If an anhydrous product is desired, the last washing may be with diethyl ether.

The resulting product is similar in appearance to the starting material. If not in powder form, it may be ground, or, after dissolving in water, spray dried. If flake form is desired, it may be dissolved in water, spread on a surface, like a plate or revolving drum, and dried as a thin film. In any event, it has been found that the methylated product has much higher resistance to depolymerization under the action of air-borne fungus and enzymes than does the polysaccharide starting material, taking three to four times longer to depolymerize to a given degree.

The invention will be more readily understood from a consideration of the specific examples which are given for the purpose of illustration only and are not intended to limit the scope of the invention in any way.

*Example 1*

Ten thousand grams of aloe leaf are shredded to give 8000 g. of juice. A 2% aqueous phosphomolybdic acid (2% of $H_3PO_4 \cdot 12 MoO_3$ by weight) solution in the amount of 0.005 grams of solution, is added to the juice and the mixture is stirred. The precipitate which forms is filtered off, and the filtrate is poured into 32,000 g. of methanol and the mixture is stirred. The resulting blue-green precipitate is filtered off and it, amounting to 50 g., is added to 500 g. of 99% methanol. Aqueous hydrochlorous acid, in an amount equivalent to 2.5 g. chlorine, is added, and the precipitate becomes white. The white precipitate is filtered off and is washed by mixing with 300 g. 99% methanol and centrifuging. This washing is repeated three more times. Following the last washing, the white, amorphous, fibrous precipitate is dried under vacuum, at 40–50° C., and ground to a white, amorphous powder through 60 mesh. This material may be dispersed in water with the aid of a blender, colloid mill or ultrasonic vibration.

The product has a molecular weight of about 450,000 and analyzes as follows:

| | Percent |
|---|---|
| Glucose residue | 37.7 |
| Mannose residue | 37.7 |
| Glucuronic acid residue | 1.8 |
| Calcium (chemically bound) | 14.9 |
| Water (chemically bound) | 7.9 |

A portion of the foregoing hydrated polysaccharide material is dispersed in 25 times its weight of anhydrous methanol. Ethylene glycol is added in an amount equal to 0.5%, by weight, based on the weight of the methanol. Hydrogen chloride gas, to the extent of 0.2%, by weight, based on the weight of the product, is passed into the dispersion which is refluxed for four hours. The insoluble product is filtered off, washed, three times with anhydrous methanol and once with diethyl ether, and dried. The resulating product is hydrolyzed in aqueous hydrochloric acid, and quantitative analysis shows 2.8% methylated sugars.

*Example 2*

The procedure of Example 1 is followed except that: propylene glycol, instead of ethylene glycol, is added to the methanol and in an amount equal to 3% by weight based on the weight of the methanol, and hydrogen chloride in the amount of 4% instead of 0.2% is used. The resulting product analyzes 16.2% methylated sugars.

*Example 3*

The procedure of Example 1 is followed except that: 2% of ethylene glycol and 2% of hydrogen chloride are used, and the methylating mixture is heated at 50° C. for two hours instead of refluxing. The resulting product analyzes 4.4% methylated sugars.

*Example 4*

The procedure of Example 1 is followed except that, in preparing the starting polysaccharide, anhydrous methanol, instead of 99% methanol, is used for washing so that the starting material contains no chemically bound water.

Work with rabbits having severe burn injuries has shown that the product of the invention produces marked healing when applied as an aqueous gel to the burn.

Modification is possible in the selection of equivalent solvents and reagents as well as in the procedural techniques selected without departing from the scope of the invention.

I claim:

A methylated polysaccharide having the formula $$[(glucose)_m \cdot (mannose)_m \cdot (glucuronic\ acid\ residue)_n \cdot (Ca)_p (CH_3)_q \cdot YH_2O]_x$$

where $m$ is an integer providing from about 30 to about 37%, by weight, of the unit; $n$ is an integer providing from about 0.9 to about 1.7% of the unit; $p$ is an integer which provides from about 11.5 to about 14.2% of the unit; $q$ is an integer providing from about 2 to about 20% of the unit; Y is an integer providing 0 to about 8.5% of the unit, and $x$ is an integer providing a molecular weight of from about 430,000 to about 620,000.

References Cited

UNITED STATES PATENTS

| | | | |
|---|---|---|---|
| 2,276,621 | 3/1942 | Langlois | 260—210 |
| 2,390,507 | 12/1945 | Cantor | 260—210 |
| 2,606,186 | 8/1952 | Dean et al. | 260—210 |
| 3,054,689 | 9/1962 | Jeanes et al. | 260—210 |

LEWIS GOTTS, *Primary Examiner.*

J. R. BROWN, *Assistant Examiner.*

UNITED STATES PATENT OFFICE

CERTIFICATE OF CORRECTION

Patent No. 3,360,510                               December 26, 1967

Alexander Farkas et al.

It is certified that error appears in the above identified patent and that said Letters Patent are hereby corrected as shown below:

In the heading to the printed specification, after line 5, insert -- , and Robert A. Mayer, 1850 N. W. 180th St., Opa Locka Fla. 33714 --.

Signed and sealed this 13th day of January 1970.

(SEAL)
Attest:

Edward M. Fletcher, Jr.                      WILLIAM E. SCHUYLER, JR.

Attesting Officer                                 Commissioner of Patents